(12) United States Patent
Kumar et al.

(10) Patent No.: US 11,747,156 B2
(45) Date of Patent: Sep. 5, 2023

(54) METHOD AND SYSTEM FOR GENERATING MANEUVERING TRAJECTORIES FOR A VEHICLE

(71) Applicant: Wipro Limited, Bangalore (IN)

(72) Inventors: Balaji Sunil Kumar, Bangalore (IN); Manas Sarkar, Barasat (IN)

(73) Assignee: Wipro Limited, Karnataka (IN)

( * ) Notice: Subject to any disclaimer, the term of this patent is extended or adjusted under 35 U.S.C. 154(b) by 204 days.

(21) Appl. No.: 17/187,910

(22) Filed: Mar. 1, 2021

(65) Prior Publication Data

US 2022/0221294 A1 Jul. 14, 2022

(30) Foreign Application Priority Data

Jan. 14, 2021 (IN) .............................. 202141001859

(51) Int. Cl.
 *G01C 21/34* (2006.01)
 *G01C 21/36* (2006.01)
 *B60R 16/023* (2006.01)

(52) U.S. Cl.
 CPC ...... *G01C 21/3492* (2013.01); *B60R 16/0231* (2013.01); *G01C 21/3691* (2013.01)

(58) Field of Classification Search
 CPC ............ G01C 21/3492; G01C 21/3691; B60R 16/0231
 See application file for complete search history.

(56) References Cited

U.S. PATENT DOCUMENTS

| | | | |
|---|---|---|---|
| 10,768,011 B2 * | 9/2020 | Sunil Kumar | G05D 1/0274 |
| 11,442,467 B2 * | 9/2022 | Sarkar | G05D 1/0223 |
| 11,487,292 B2 * | 11/2022 | Kumar | B60W 60/001 |
| 11,498,586 B2 * | 11/2022 | Kumar | B60W 60/0011 |
| 2013/0054133 A1 * | 2/2013 | Lewis | G01C 21/3667 701/423 |
| 2013/0096732 A1 | 4/2013 | Hagenme et al. | |
| 2016/0027300 A1 * | 1/2016 | Raamot | G08G 1/0145 340/922 |
| 2016/0223350 A1 * | 8/2016 | Lewis | G08G 1/096725 |
| 2019/0033085 A1 * | 1/2019 | Ogale | G01C 21/3446 |
| 2019/0056739 A1 * | 2/2019 | Sunil Kumar | G05D 1/0268 |
| 2019/0250617 A1 * | 8/2019 | Ford | G05D 1/0212 |
| 2019/0250624 A1 * | 8/2019 | Sunil Kumar | G05D 1/0217 |
| 2020/0166940 A1 * | 5/2020 | Sarkar | G05D 1/0223 |

(Continued)

FOREIGN PATENT DOCUMENTS

DE 102013020699 A1 5/2015

*Primary Examiner* — Luis A Martinez Borrero
(74) *Attorney, Agent, or Firm* — Finnegan, Henderson, Farabow, Garrett & Dunner, LLP

(57) ABSTRACT

The present disclosure relates to generating maneuvering trajectories using Machine Learning (ML) model. The ML model scores each candidate maneuvering trajectories based on a plurality of dynamic profile parameters. A candidate maneuvering trajectory from a plurality of candidate maneuvering trajectories, having a best trajectory score is selected as the final maneuvering trajectory and is provided to the vehicle for navigating according to the final maneuvering trajectory. The final maneuvering trajectory is the most ideal trajectory as it is generated using the ML model based on the plurality of dynamic profile parameters. Also, the vehicle navigation is most efficient when navigated according to the final maneuvering trajectory.

11 Claims, 9 Drawing Sheets

(56) References Cited

U.S. PATENT DOCUMENTS

| | | | | |
|---|---|---|---|---|
| 2020/0310437 A1* | 10/2020 | Kumar | ................ | G01C 21/3453 |
| 2020/0377090 A1* | 12/2020 | Seccamonte | ........... | G06N 3/084 |
| 2021/0095976 A1* | 4/2021 | Sarkar | ................ | G01C 21/3453 |
| 2021/0114617 A1* | 4/2021 | Phillips | ............. | B60W 30/0956 |
| 2021/0146913 A1* | 5/2021 | Kumar | ................ | B60W 20/50 |
| 2021/0253103 A1* | 8/2021 | Kumar | ................ | B60W 60/001 |
| 2021/0269059 A1* | 9/2021 | Djuric | .................... | G06N 3/088 |
| 2021/0297345 A1* | 9/2021 | Sawyer | ............... | H04L 49/3009 |
| 2021/0300426 A1* | 9/2021 | Kumar | ................ | B60W 40/076 |
| 2021/0311479 A1* | 10/2021 | Kumar | ................ | G05D 1/0212 |
| 2021/0402991 A1* | 12/2021 | Gautam | ............ | B60W 30/0956 |
| 2022/0055651 A1* | 2/2022 | Baric | .................... | G06N 20/00 |
| 2022/0066459 A1* | 3/2022 | Jain | ........................ | G06N 3/045 |
| 2022/0169278 A1* | 6/2022 | Refaat | .................... | G06N 3/045 |
| 2022/0227391 A1* | 7/2022 | Wang | .................... | B60W 40/06 |

\* cited by examiner

METHOD AND SYSTEM FOR GENERATING MANEUVERING TRAJECTORIES FOR A VEHICLE

TECHNICAL FIELD

The present disclosure relates to automobile industry. Particularly, but not exclusively, the present disclosure relates to method and system for generating maneuvering trajectories for vehicles.

BACKGROUND

Guidance systems are widely used in manually driven vehicles and autonomous vehicles. The guidance system helps navigate seamlessly from a source to a destination. For example maps help a driver to identify roadblocks and drive via alternate routes. Currently, the guidance systems are advanced and provide various types of services such as identifying obstacles in a path, recommending services available in a path, recommending best maneuvering trajectories, and the like. The guidance system helps a driver to drive with ease and helps an autonomous and semi-autonomous vehicle to traverse a path effectively.

Generally, multiple trajectories are generated from a source location to a destination location and is referred as a global path in the domain. However, the global path does not consider the exact location of the vehicle, but considers a location on the global path closest to the location of the vehicle. For example, when the vehicle is in a garage, the trajectory from the source to the destination is not shown from the garage, but from a point on a road closest to the garage. It is important for the vehicle to efficiently reach the point on the global path from its current location. Existing guidance systems do not generate efficient trajectories for the vehicle to reach the point on the global path from its current location.

Hence, there is a need to generate efficient maneuvering trajectories for the vehicle to reach a goal point (e.g., point on the global path, parking space and the like) from its current location.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of generating maneuvering trajectories for a vehicle in real-time. The method comprises obtaining a plurality of candidate maneuvering trajectories for maneuvering the vehicle to reach a goal point. Further, a plurality of dynamic profile parameters associated with each of the plurality of candidate maneuvering trajectories are determined. Furthermore, a trajectory score is generated for each of the plurality of candidate maneuvering trajectories using a Machine Learning (ML) model. The ML model is trained using the plurality of dynamic parameters during a training stage. Thereafter, a final maneuvering trajectory is generated from the plurality of candidate maneuvering trajectories based on the trajectory score. The vehicle is navigated according to the final maneuvering trajectory. The use of ML model to select the final maneuvering trajectory increases efficiency in the navigation.

In an embodiment, the present disclosure relates to a system for generating a maneuvering trajectory for a vehicle in real-time. The system comprises an Electronic Control Unit (ECU) which is configured in the vehicle. The ECU comprising at least one processor and a memory storing instructions that when executed by the at least one processor, cause the at least one processor to obtain a plurality of candidate maneuvering trajectories for maneuvering the vehicle to reach a goal point. Further, the ECU is configured to determine a plurality of dynamic profile parameters associated with each of the plurality of candidate maneuvering trajectories. Furthermore the at least one processor is configured to generate a trajectory score for each of the plurality of candidate maneuvering trajectories using a Machine Learning (ML) model. The ML model is trained using the plurality of dynamic profile parameters during a training stage. Thereafter, the at least one processor is configured to generate a final maneuvering trajectory from the plurality of candidate maneuvering trajectories based on the trajectory score. The vehicle is navigated according to the final maneuvering trajectory. The use of ML model to select the final maneuvering trajectory increases efficiency in the navigation.

In an embodiment a non-transitory computer readable medium is disclosed. The non-transitory medium included instructions stored that when processed by at least one processor cause a device to perform operations comprising, obtaining a plurality of candidate maneuvering trajectories for maneuvering the vehicle to reach a goal point; determining a plurality of dynamic profile parameters associated with each of the plurality of candidate maneuvering trajectories; generating a trajectory score for each of the plurality of candidate maneuvering trajectories using a Machine Learning (ML) model, wherein the ML model is trained using the plurality of dynamic profile parameters; and generating a final maneuvering trajectory from the plurality of candidate maneuvering trajectories based on the trajectory score, wherein the vehicle is navigated based on the final maneuvering trajectory.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
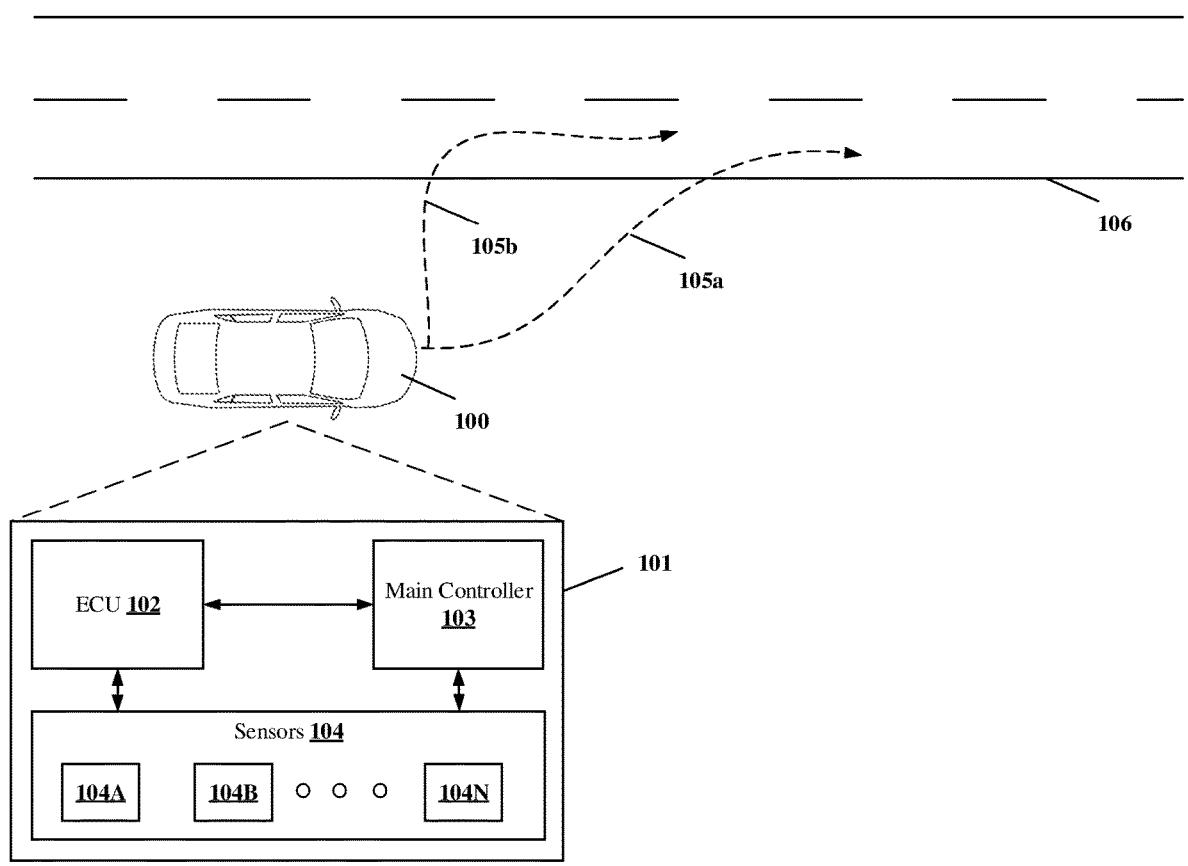
FIG. 1 is illustration of an environment for generating maneuvering trajectories for a vehicle in real-time, in accordance with some embodiments of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to generating maneuvering trajectories. Maneuvering trajectories may be trajectories that are generated for the vehicle to reach a goal point, such as a point on a global path from a current vehicle location. The present disclosure uses Machine Learning (ML) model based approach to generate a final maneuvering trajectory from a plurality of candidate maneuvering trajectories. The ML model scores each candidate maneuvering trajectories based on a plurality of dynamic profile parameters. The candidate maneuvering trajectory having a best trajectory score is selected as the final maneuvering trajectory and is provided to the vehicle for navigating according to the final maneuvering trajectory. The final maneuvering trajectory is the most ideal trajectory as it is generated using the ML model based on the plurality dynamic profile parameters. Also, the vehicle navigation is most efficient when navigated according to the final maneuvering trajectory.

FIG. 1 shows an environment of generating a maneuvering trajectory for a vehicle (100). The environment includes the vehicle (100), a road (106), and a plurality of candidate maneuvering trajectories (105a, 105b). The vehicle (100) includes a system (101). The system (101) may include an Electronic Control Unit (ECU) (102), a main controller (103) and one or more sensors (104A, 104B, . . . , 104N, collectively referred to by the reference numeral "104"). In an embodiment, the plurality of candidate maneuvering trajectories (105a, 105b) are generated for the vehicle to reach a goal point. The goal point may be a point on the global path, a parking space, a gas station and the like. In an embodiment, the goal point may or may not be same as the source/destination location which is used for generating the global path. For example, in a parking premise the goal point is the parking space for the vehicle 100. Likewise, a vehicle 100 moving out of a garage to the road (106), a point on the road (106) is the goal point. Another example of the goal point is a gas/charging station, where the vehicle 100 can fill gas or get charged.

In an embodiment, the one or more sensors (104) may include, but not limited to, a Light Detection and Ranging (LIDAR), an imaging sensor, a proximity sensor, and a weather sensor. The one or more sensors (104) may be installed on the vehicle (100) to measure road and environment information. In an embodiment, the main controller (103) may be used for autonomously navigating the autonomous vehicle (100) in a forward path. The main controller (103) may be connected to the one or more sensors (104) and may receive the road information from the one or more sensors (104). In an embodiment, the ECU (102) may be a part of the main controller (103) or may be a standalone unit and associated with the main controller (103). When the ECU (102) is part of the main controller (103), the ECU (102) may receive the road information from the one or more sensors (104). When the ECU (102) is a standalone unit, the ECU (102) may receive the road information from the main controller (103) which would have received the same from the one or more sensors (104). In an embodiment, the ECU (102) may be configured to determine a plurality of trajectory parameters from the road information. The plurality of trajectory parameters may be road parameters associated with the vehicle (100). In an embodiment, the plurality of trajectory parameters may include, but not limited to, the speed breaker, a gradient, a curvature, a pothole, a road boundary, an obstacle, a traffic sign, a road sign, and a median. Further, the ECU (102) may be configured to generate a plurality of candidate maneuvering trajectories based on the plurality of trajectory parameters. The ECU (102) may select a most relevant maneuvering trajectory from the plurality of candidate maneuvering trajectories and provide to the main controller (103) to navigate the vehicle (100) according to the selected maneuvering trajectory. The selected maneuvering trajectory ensures efficient navigation to the goal point.

Figure 2:
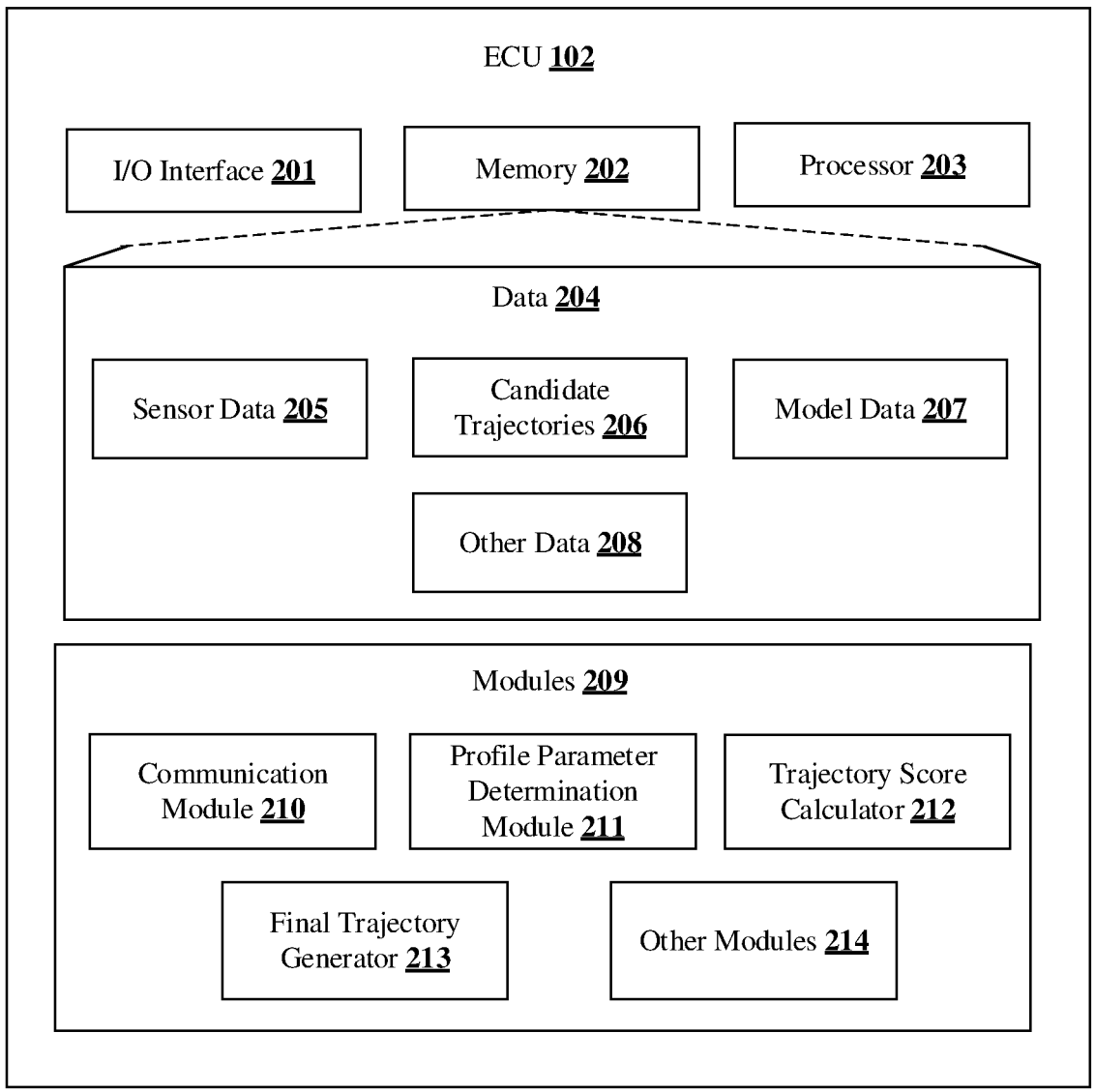
FIG. 2 is a block diagram of internal architecture of an ECU configured to generate maneuvering trajectories for a vehicle in real-time, in accordance with some embodiments of the present disclosure.

FIG. 2 illustrates internal architecture of the ECU (102) in accordance with some embodiments of the present disclosure. The ECU (102) may include at least one Central Processing Unit ("CPU" or "processor") (203) and a memory (202) storing instructions executable by the at least one processor (203). The processor (203) may include at least one data processor for executing program components for executing user or system-generated requests. The memory (202) is communicatively coupled to the processor (203). The ECU (102) further includes an Input/Output (I/O) interface (201). The I/O interface (201) is coupled with the processor (203) through which an input signal or/and an output signal is communicated.

In an embodiment, data (204) may be stored within the memory (202). The data (204) may include, for example, sensor data (205), candidate trajectories (206), model data (207), and other data (208).

In an embodiment, the sensor data (205) may include road and environment information. The one or more sensors (104) may detect any obstacles and monitors road parameters for the vehicle 100 to reach the goal point. The obstacles and the plurality of trajectory parameters are provided as road information to the main controller (103) or the ECU (102). For example, the one or more sensors (104) may detect a road curvature of a first and second candidate maneuvering trajectory. Another example may include detecting distance of a first and second candidate maneuvering trajectory for reaching the goal point from a current vehicle location.

In an embodiment, the candidate maneuvering trajectories (206) may include waypoints for generating trajectories from the current vehicle location to the goal point. The ECU (102) may use the waypoints to generate the plurality of candidate maneuvering trajectories (206). In an embodiment, the candidate maneuvering trajectories (206) may include the trajectories (path) itself rather than the waypoints. Each candidate maneuvering trajectory may navigate the vehicle (100) from its current location to the goal point.

In an embodiment, the model data (207) may include parameters of an Artificial Intelligence (AI) model. The parameters of the AI model may include but not limited to training data set, bias values, weight values, and activation functions. The training data set may be used to train the AI model during a training stage to generate a trajectory score for each of the plurality of candidate maneuvering trajectories (206). The training data set may include the plurality of trajectory parameters and dynamic profile parameters. In an embodiment, training profile parameters for training trajectories may be provided by an expert during the training stage. In an embodiment, the training data set may be generated using simulation or by navigating the vehicle (100) on test paths. In an embodiment, the weight values may indicate a strength of association between one or more input nodes and one or more output nodes. In an embodiment, the bias values may indicate how the AI model fits with the training data set. For example, high bias may indicate that the AI model is not fitting the training data set and a low bias may indicate that the AI model is fitting the training data set.

In an embodiment, the other data (208) may include but is not limited to traffic information, navigation details, environment parameters and the like. For example, the traffic information may include number of vehicles on the road (106), the navigation details may include a source location and a destination location and the environment parameters may include a temperature around the autonomous vehicle (100).

In the data (204) in the memory (202) is processed by modules (209) of the ECU (102). As used herein, the term module refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The modules (209) when configured with the functionality defined in the present disclosure will result in a novel hardware.

In one implementation, the modules (209) may include, for example, a communication module (210), a profile parameter determination module (211), a trajectory score calculator (212), a final trajectory generator (213), and other modules (214). It will be appreciated that such aforementioned modules (209) may be represented as a single module or a combination of different modules.

The communication module (210) may be configured to enable communication between the ECU (102) and other units (not shown in figures) of the vehicle (100). In an embodiment, the other units may comprise, but are not limited to, a transmission control unit, door unit, a steering controller, an indication unit, etc. For example, the communication module (210) may receive sensor data (205) from the one or more sensors (104). Also, the communication module (210) may convey instructions to the main controller (103). Also, the communication module (210) may communicate instructions to the one or more sensors (104) regarding activation and deactivation of the one or more sensors (104).

In an embodiment, the profile parameter determination module (211) may be configured to determine the plurality of dynamic profile parameters for each candidate maneuvering trajectory. The profile parameter determination module (211) may receive the plurality of candidate maneuvering trajectories (206) from the communication module (210) and determine the plurality of dynamic profile parameters for each of the plurality of candidate maneuvering trajectories (206). In an embodiment, the profile parameter determination module (211) may be configured in the vehicle (100) or may be configured in a remote server (not shown in FIG. 2) or may be configured in both the server and the vehicle (100).

In an embodiment, the trajectory score calculator (212) may be configured to produce or generate a trajectory score for each of the plurality of candidate maneuvering trajectories (206) based on the plurality of dynamic profile parameters. The trajectory score calculator (212) may receive the dynamic profile parameters from the profile parameters determination module (211) and the plurality of candidate maneuvering trajectories (206) from the communication module (210), and generate the trajectory score using the ML model. In an embodiment, the ML model may be trained to generate the trajectory score based on the training data set. In an embodiment, the ML model may be configured to generate the trajectory score based on one or more rules defined by a domain expert. For example, a first candidate maneuvering trajectory having a larger curvature compared to a second candidate maneuvering trajectory may be associated with a lower trajectory score. Likewise, the plurality of dynamic profile parameters are considered to generate the trajectory score for each of the plurality of candidate maneuvering trajectories (206).

In an embodiment, final trajectory generator (213) may be configured to generate or select a final maneuvering trajectory from the plurality of candidate maneuvering trajectories (206) based on respective trajectory score, and provide the final maneuvering trajectory to the vehicle (100) to reach the goal point. The final trajectory generator (213) may compare each of the plurality of candidate maneuvering trajectories (206) with each other and identify the final maneuvering trajectory having a highest trajectory score. For example, the first candidate maneuvering trajectory may be associated with a trajectory score of 8.1 and the second candidate maneuvering trajectory may be associated with a trajectory score of 8.9. The final trajectory generator (213) may select the second candidate maneuvering trajectory as the final maneuvering trajectory after comparing the first and the second candidate maneuvering trajectories (206).

In an embodiment, the other modules (214) may include, but is not limited to a localization module, a path planning module, a trajectory generation module, a navigator module, and a vehicle control module.

In an embodiment, the navigator module may be configured to initiate navigation process from path planning to velocity generation to autonomously drive from a source location to a destination location. In an embodiment, the navigator module may be a User Interface (UI). The navigator module may display the UI with a map to the user. In the map, user may be able to see the current initial vehicle location and select the destination location.

In an embodiment, the path planning module may be configured to generate a base path from the source location to the destination location. In an embodiment, techniques such as Dijkstra, A* may be used to generate the base path.

In an embodiment, the one or more trajectory generation module with different criteria of looking into the problem of trajectory generation may be configured to generate a plurality of maneuvering trajectories from the current location of the vehicle (100) to the base path. As the base path is generated from a point on the road (106), the plurality of maneuvering trajectories are generated from the current location of the vehicle (100) (e.g., garage, gas station, charging station) to the point on the road (106). In one embodiment, one or more trajectory generation modules may be used to generate the plurality of maneuvering trajectories. In an embodiment, the one or more trajectory generation modules may use the plurality of trajectory parameters to generate the plurality of maneuvering trajectories. For example, a first trajectory generation module may generate a plurality of aggressive maneuvering trajectories, a second trajectory generation module may generate a plurality of cautious maneuvering trajectories, a third trajectory generation module may generate a plurality of long and safe maneuvering trajectories. In one embodiment, a best maneuvering trajectory among the plurality of maneuvering trajectories generated by each of the one or more trajectory generation module is considered as the plurality of candidate maneuvering trajectories (206). Therefore, the maneuvering trajectories are considered based on different parameters and the final maneuvering trajectory is then generated based on the trajectory score. Hence, the final maneuvering trajectory is selected based on current condition of the vehicle (100) and the current base path from the source to the destination.

In an embodiment, the vehicle control module may be configured to provide control signals to the vehicle (100). For example, the vehicle control module may provide control signals to braking system or propeller.

In an embodiment, the localization module may be configured to provide current location of the vehicle (100) on the map. In some embodiments, the localization module may use camera-based approach to localize the vehicle (100) by observing the surroundings.

Figure 3:
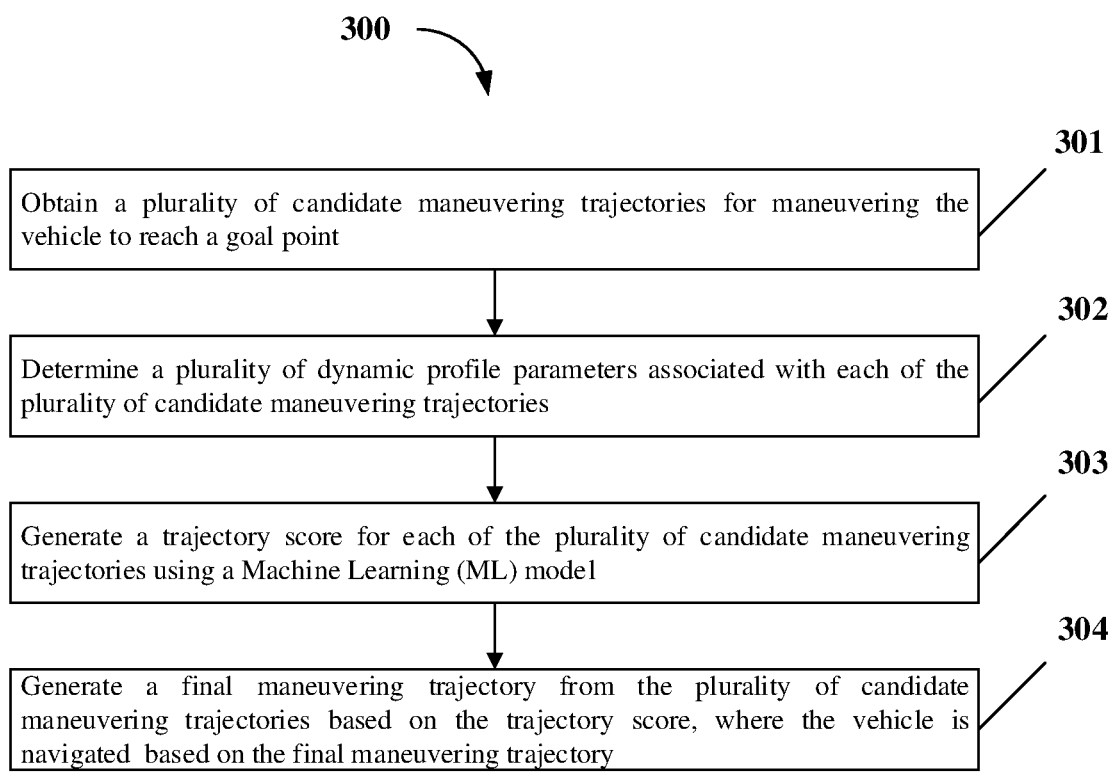
FIG. 3 is a flow diagram illustrating steps for generating maneuvering trajectories for a vehicle in real-time, in accordance with some embodiments of the present disclosure.

FIG. 3 shows a flow chart illustrating a method of generating maneuvering trajectories for the vehicle (100) in real-time, in accordance with some embodiments of the present disclosure.

As illustrated in FIG. 3, the method (300) may comprise one or more steps. The method (300) may be described in the general context of computer executable instructions. Generally, computer executable instructions can include routines, programs, objects, components, data structures, procedures, modules, and functions, which perform particular functions or implement particular abstract data types.

The order in which the method (300) is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step (301), the communication module (210) may receive the plurality of candidate maneuvering trajectories (206) from the one or more trajectory generation modules. In an embodiment, a best maneuvering trajectory is received from each of the one or more trajectory generation module. The group of best maneuvering trajectories form the plurality of candidate maneuvering trajectories (206). In an embodiment, the plurality of candidate maneuvering trajectories (206) are generated for the vehicle (100) to reach the goal point from its current location. For example, the plurality of candidate maneuver trajectory may be generated from a gas station to the road (106). Referring to the same example, two maneuver trajectories may be generated in a forward path and one maneuver trajectory may be generated in a reverse path. In an embodiment, the plurality of candidate maneuvering trajectories (206) may be generated based on a plurality of trajectory parameters. The plurality of trajectory parameters may include, but are not limited to, a vehicle pose, a goal pose, a curvature of the plurality of candidate maneuvering trajectories (206), reversing space dimension, side space dimension, forward space dimension, magnitude of direction change in route in forward path, buffer space between lane and utility space and turn count.

At step (302), the profile parameter determination module (211) may determine the plurality of dynamic profile parameters associated with each of the plurality of candidate maneuvering trajectories (206). In an embodiment, the plurality of dynamic profile parameters may be defined by a domain expert and the profile parameter determination module (211) may determine an observation score for each of the plurality of dynamic profile parameters. In an embodiment, the profile parameter determination module (211) may implement the ML model to determine the observation score for each of the plurality of dynamic profile parameters.

Figure 4:
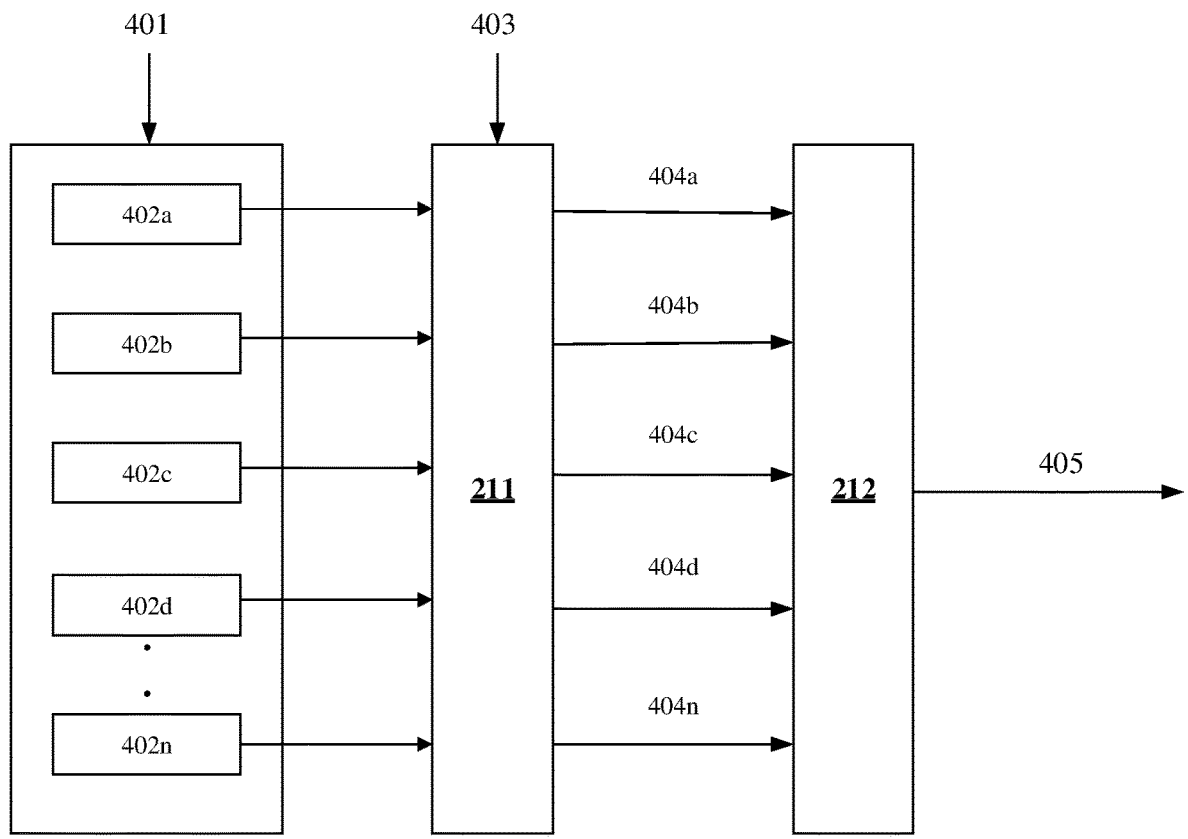
FIG. 4 illustrates training of a ML model for generating trajectory score, in accordance with some embodiments of the present disclosure.

Reference is now made to FIG. 4 which illustrates training of the ML model. As shown in the FIG. 4, the ML model may be implemented by the profile parameter determination module (211) and the trajectory score calculator (212). The ML model may receive training trajectories (401) and corresponding profile parameters (402a, . . . , 402n), and weights (403) as input. The training trajectories (401) may be traversed by an operator. For example, the operator may traverse test runs and generate a plurality of training trajectories (401) to maneuver the vehicle (100) to the goal point. Further, the operator may provide the training trajectories (401) and corresponding profile parameters (402a, . . . 402n) as input to the ML model. Further, the operator or the domain expert may define weights (403) for each profile parameter. Table 1 shows an example of weights (403) associated with the profile parameters (402a, . . . 402n).

TABLE 1

| Profile Parameter | Weight |
| --- | --- |
| Lane congestion | 0.35 |
| Lane blocking duration | 0.1 |
| Curvature | 0.25 |
| Length of trajectory | 0.1 |
| Change in direction | 0.2 |

In an embodiment, the lane congestion (402a) may be a measure of distance and speed assessment of other vehicles in a rear side of the vehicle (100). The observation score (404a) for the lane congestion (402a) may be calculated as Slc=1/Tw, where Slc is the observation score, Tw (404a) is the wait time between Tvh and Tovh, where Tvh is the time taken by the vehicle (100) to reach the goal point and Tovh is the time taken by other vehicles to reach the goal point. The Tv is selected such that Tv>Tovh.

In an embodiment, lane blocking duration (402b) may be a measure of time duration for which other vehicle block the lane (goal point), when the plurality of candidate maneuvering trajectories (206) are generated for the vehicle (100) to reach the lane. The observation score (404b) for the lane blocking duration may be calculated as Slb=30/Tb, where Slb is the observation score (404b) and Tb is the duration for which the lane is blocked.

In an embodiment, the number of turns (402c) is a measure of number of turns required for the vehicle (100) to reach the goal point in the maneuver trajectory. The observation score (404c) for the number of turns is calculated as St=T/10, where St is the observation score (404c) and T is the number of turns.

In an embodiment, the observation score (404d) for length of trajectory (402d) is calculated as Slt=1/(L %5), where Slt is the observation score (404d), and L is the length of the trajectory (402d).

In an embodiment, the change in direction (402e) is the measure of number of times the vehicle (100) has to change direction to reach the goal point. The observation score (404e) for the change in direction is calculated as Scd=1/Nt, where Scd is the observation score (404e) and Nt is the number of times the direction is changed.

In an embodiment, the operator may annotate the observation scores (404a, . . . 404n) for the profile parameters (402a, . . . 402n) during training. In another embodiment, the ECU (102) may calculate the observation score (404a, . . . 404n) for the profile parameters (402a, . . . 402n) and the operator may feedback the observation score (404a, . . . 404n) for each training trajectory and the ML model may adjust the weights (403) to correct the observation scores (404a, . . . 404n). Further, the operator may vary the values of the weights (403) based on different environmental conditions. For example, in a hilly terrain, the change in direction may be provided with lower weight (403) than in a flat terrain. Likewise, lane congestion (402a) may be provided more weight (403) within city limits than on a highway. The ML model may be trained to determine an appropriate observation score (404a, . . . , 404n) for the profile parameters (402a, . . . , 402n). Further, the ML model may also be trained to dynamically update the weight (403) values based on different scenarios. Thereafter, the ML model may be trained to generate the intermediate trajectory score for each profile parameter for a training trajectory (401) and thereafter a final trajectory score (405) for the training trajectory (401). In an embodiment, the final trajectory score (405) may be an average of the intermediate trajectory score of all the profile parameters (402a, . . . 402n). Likewise, the final trajectory score (405) is generated for each trajectory profile.

Referring back to FIG. 3, at step (302), during the inference stage the profile parameter determination module (211) may determine the observation score (404) for each dynamic profile parameter for each of the plurality of candidate maneuvering trajectories (206) using the trained ML model.

At step (303), the trajectory score calculator (212) may generate the trajectory score (405) for each of the plurality of candidate maneuvering trajectories (206). Table 2 shows an example of trajectory scores (405) for five candidate maneuvering trajectories (206) on a scale of 1-10.

TABLE 2

| Trajectory | Trajectory score |
| --- | --- |
| Trajectory 1 | 7.3 |
| Trajectory 2 | 8.2 |
| Trajectory 3 | 8.5 |
| Trajectory 4 | 7.9 |
| Trajectory 5 | 8.1 |

At step (304), the final trajectory generator (213) generates the final maneuvering trajectory by comparing the trajectory scores of the candidate maneuvering trajectories (206) with each other. In an embodiment, the final trajectory generator (213) may implement a comparator to compare the trajectory score of each candidate maneuvering trajectories (206) with each other. In one embodiment, a candidate maneuvering trajectory having a maximum trajectory score is selected as the final maneuvering trajectory. For example, from the Table 2, the trajectory 3 is having a maximum trajectory score (405) of 8.5 compared to the other four trajectories. Hence, the trajectory 3 is selected as the final maneuvering trajectory and is provided to the vehicle (100) for navigating according to the trajectory 3.

Figure 5:
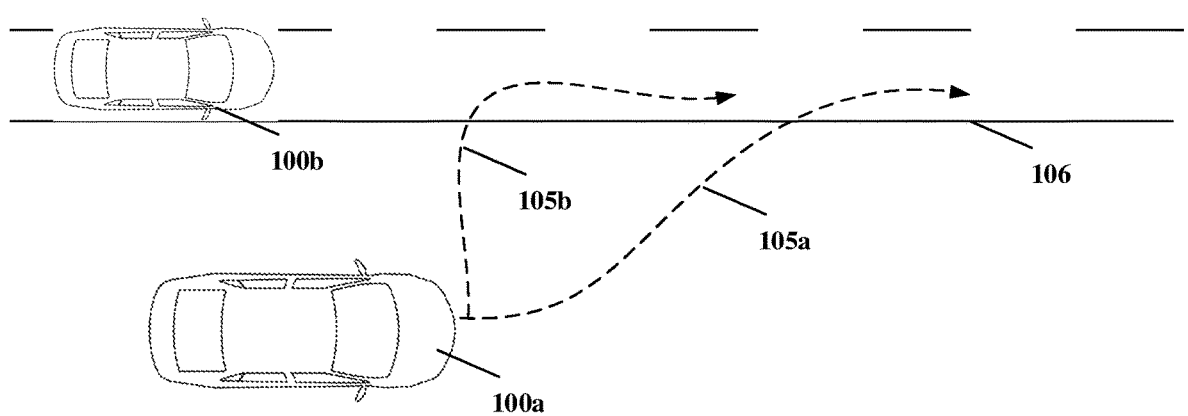
FIG. 5 illustrates an exemplified scenario of generating candidate maneuvering trajectories, in accordance with some embodiments of the present disclosure.

Reference is now made to FIG. 5 which illustrates an exemplary scenario of generating candidate maneuvering trajectories (206). As seen in FIG. 5, the vehicle (100a) has to reach the goal point on the road (106). For example, the vehicle (100a) is parked in a garage (not shown) and has to reach the goal point on the road (106). Also, there is another vehicle (100b) on the road (106) which is approaching the goal point. Considering the scenario, the vehicle (100a) has generated two candidates maneuvering trajectories (105a, 105b). Both the candidate maneuvering trajectories (105a, 105b) enable the vehicle (100a) to reach the goal point on the road (106).

Figure 6:
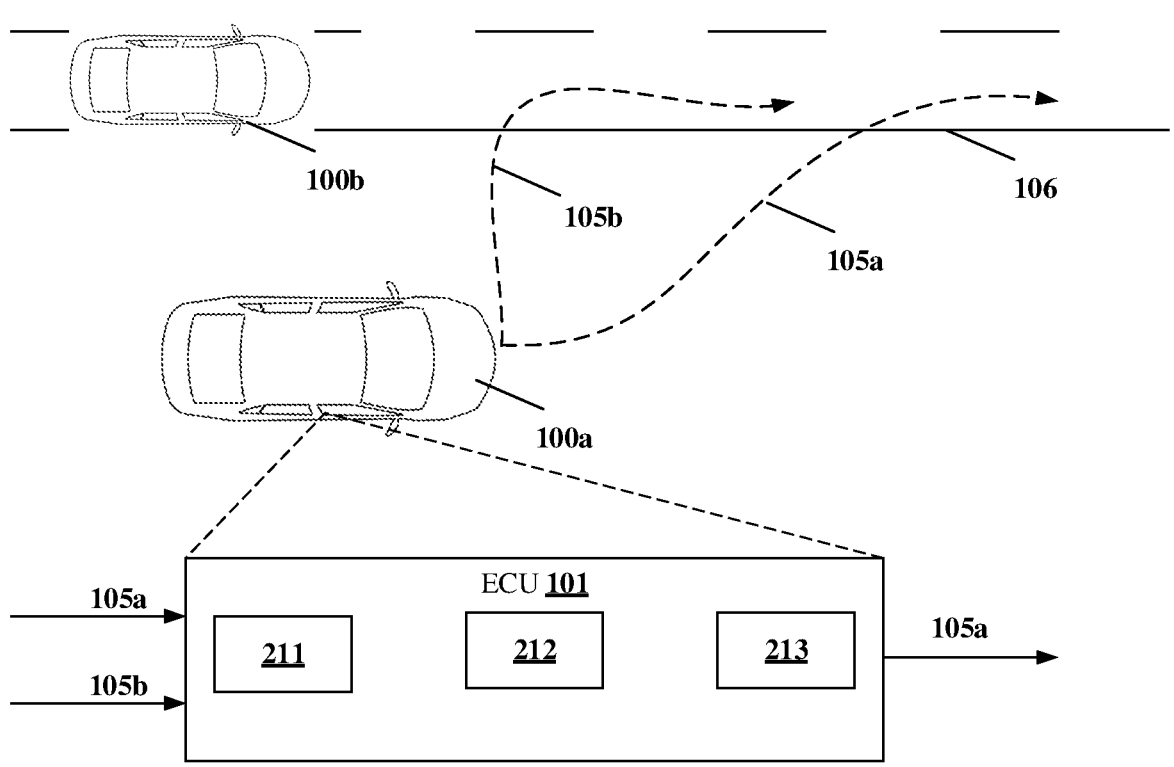
FIG. 6 illustrates an exemplified scenario of generating a final maneuvering trajectory from candidate maneuvering trajectories, in accordance with some embodiments of the present disclosure

FIG. 6 is now referred to illustrate the generation of the final maneuvering trajectory from the candidate maneuvering trajectories (105a, 105b). As seen in the FIG. 6, the candidate maneuvering trajectories (105a, 105b) are provided to the ECU (102). The parameter determination module (211), the trajectory score calculator (212) and the final trajectory score generator (213) are used to process the candidate maneuvering trajectories (105a, 105b) and generate the final maneuvering trajectory. As the vehicle (100b) is approaching the road (106) from the rear side of the vehicle (100a), the dynamic profile parameter "lane congestion" (402a) may be provided a higher weight (403) and the observation score (404a) of the candidate maneuvering trajectory (105a) may be more compared to the observation score (404a) of the candidate maneuvering trajectory (105b). Consequently, the trajectory score (405) of the candidate maneuvering trajectory (105a) is greater than the trajectory score (405) of the candidate maneuvering trajectory (105b). Therefore, the ECU (102) provides the maneuvering trajectory (105a) to the vehicle propeller to navigate the vehicle (100a) accordingly.

Figure 7A:
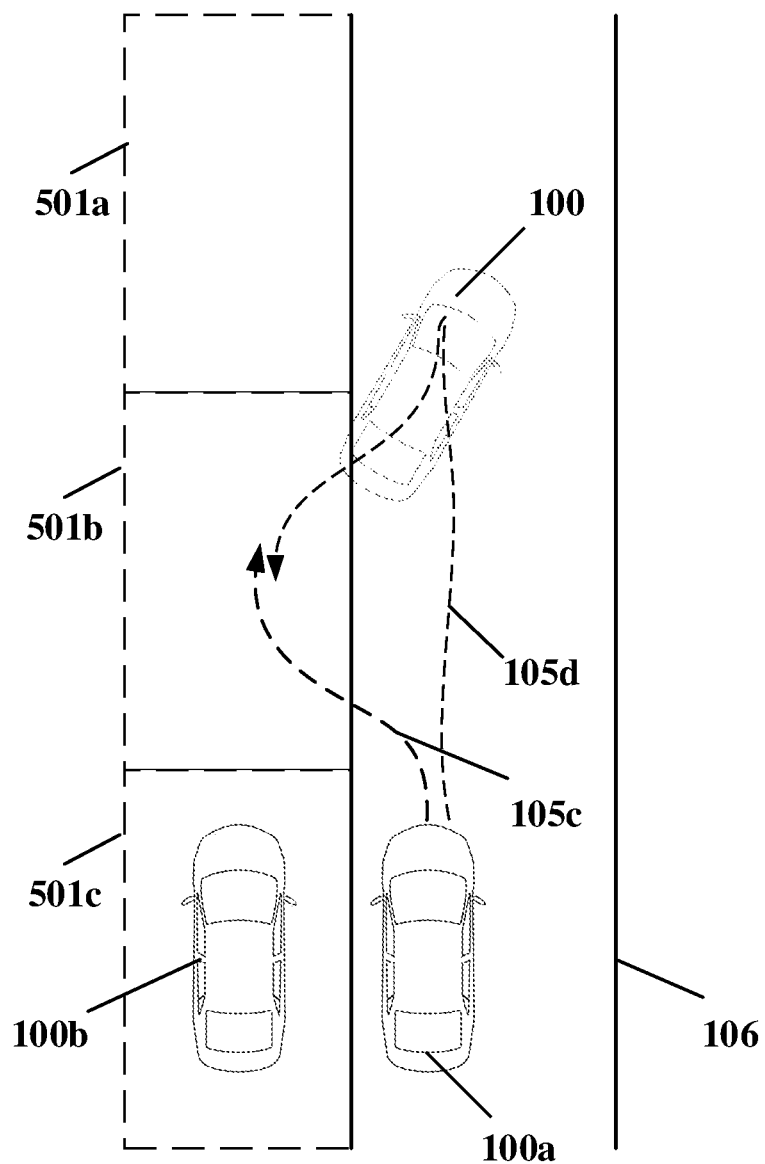
FIGS. 7a-7c illustrate exemplary scenarios of generating maneuvering trajectories, in accordance with some embodiments of the present disclosure.

FIG. 7a is an exemplary illustration of a scenario where the vehicle (100a) has to be parked in the parking space (501b) among a plurality of parking spaces (501a, 501b, 501c). As seen, the candidate maneuvering trajectories (105c, 105d) are generated. The maneuvering trajectory (105c) may navigate the vehicle (100a) very close to the vehicle (100b). Hence, the maneuvering trajectory (105d) may be selected as the final maneuvering trajectory due to the presence of the vehicle (100b) in the parking space (501c). The vehicle (100a) shown in gray shade illustrates the maneuver performed by navigating the maneuvering trajectory (105d).

Figure 7B:
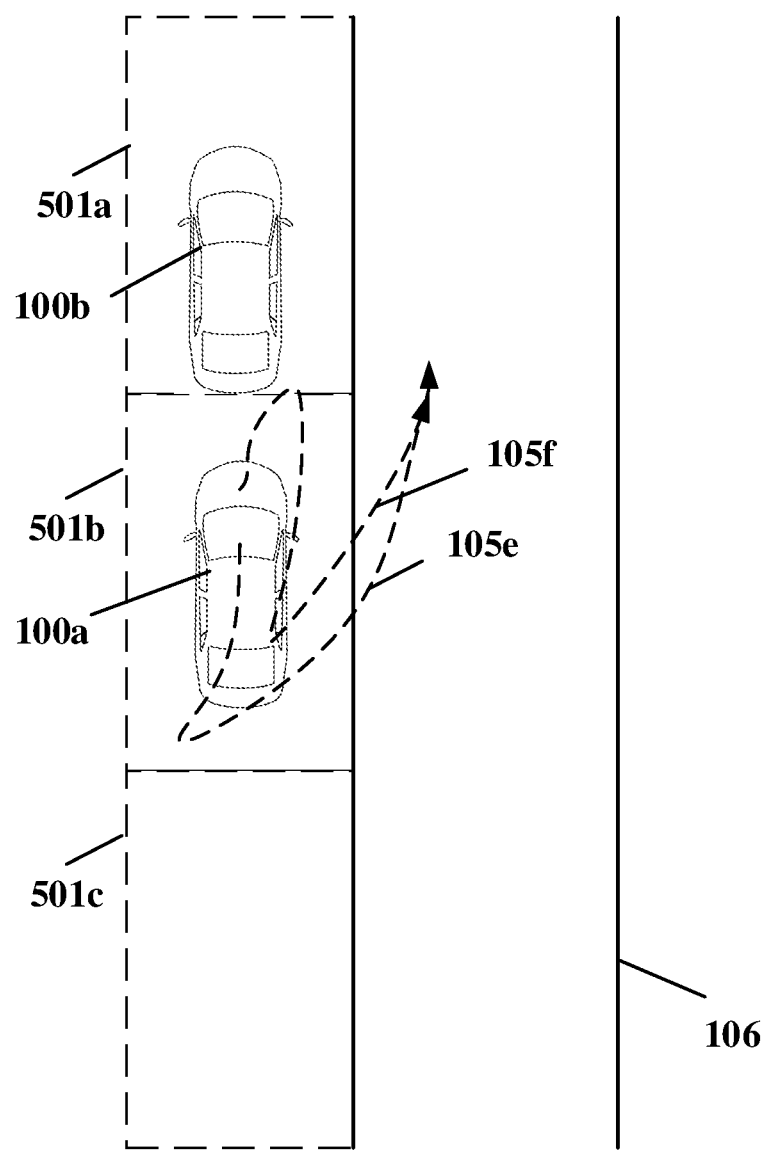

FIG. 7b is an exemplary illustration of a scenario where the vehicle (100a) has to exit the parking space (501b) among a plurality of parking spaces (501a, 501b, 501c). As seen, the candidate maneuvering trajectories (105e, 105f) are generated. The maneuvering trajectory (105f) may navigate the vehicle (100a) very close to the vehicle (100b). Hence, the maneuvering trajectory (105e) may be selected as the final maneuvering trajectory due to the presence of the vehicle (100b) in the parking space (501a).

Figure 7C:
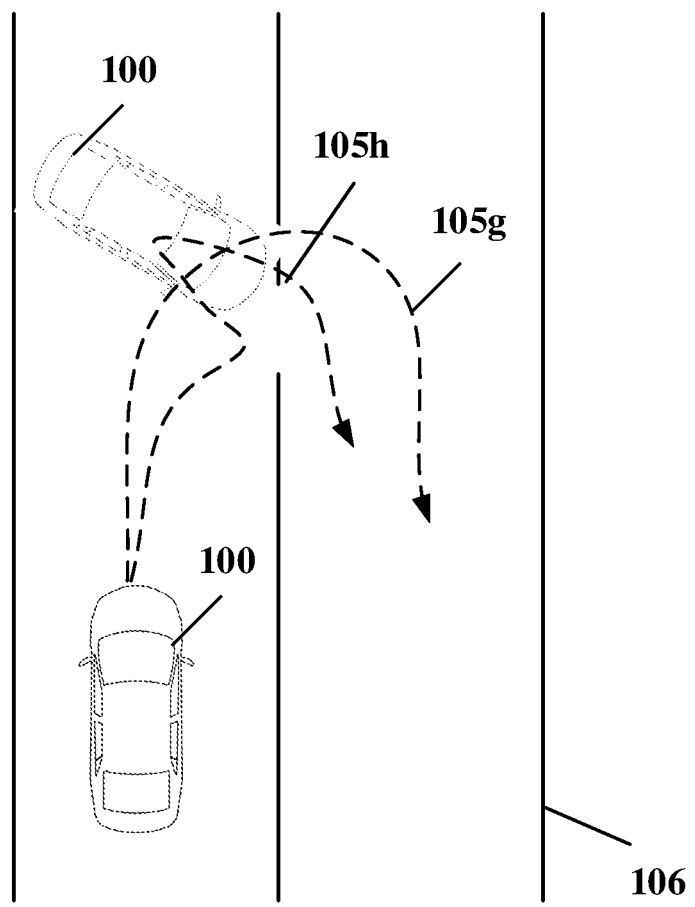

FIG. 7c is an exemplary illustration of a scenario where the vehicle (100) has to maneuver a U-turn. As seen, the candidate maneuvering trajectories (105g, 105h) are generated. The maneuvering trajectory (105g) may navigate the vehicle (100) very close to the median differentiating lanes on the road (106). Hence, the maneuvering trajectory (105h) may be selected as the final maneuvering trajectory. The vehicle (100) shown in gray shade illustrates the maneuver performed by navigating the maneuvering trajectory (105h).

The proposed method and system provides precise and calibrated trajectory path for navigating the vehicle (100). Further, the proposed method and system considers the dynamic profile parameters to select the best maneuvering trajectory among the plurality of candidate maneuvering trajectories (206). The ML technique proposed in the present disclosure, is used to select the best trajectory which was not possible in conventional systems. Also, the candidate are generated using different trajectory generation modules, which enables different perspective of generating the trajectories. Hence, the vehicle (100) can be maneuvered according to different conditions.

In light of the above mentioned advantages and the technical advancements provided by the disclosed method and system, the claimed steps as discussed are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of generating a maneuvering trajectory for a vehicle in real-time, the method comprising:
   obtaining, by an Electronic Control Unit (ECU) of the vehicle, a plurality of candidate maneuvering trajectories comprising at least one forward path and at least one reverse path, for maneuvering the vehicle to reach a goal point,
   wherein the goal point is one of: a parking space, a garage, a gas station, and a point on a global path on a road, wherein the global path is indicative of one or more trajectories from a source location to a destination location, and
   wherein the plurality of candidate maneuvering trajectories are generated based on a plurality of trajectory parameters that comprise: a vehicle pose, a goal pose, reversing space dimension, side space dimension, and forward space dimension;
   determining, by the ECU, a plurality of dynamic profile parameters associated with each of the plurality of candidate maneuvering trajectories, wherein the plurality of dynamic profile parameters comprises a length of maneuvering path and number of reverse required for maneuver;

generating, by the ECU, a trajectory score for each of the plurality of candidate maneuvering trajectories using a Machine Learning (ML) model, wherein the ML model is trained using the plurality of dynamic profile parameters; and generating, by the ECU, a final maneuvering trajectory from the plurality of candidate maneuvering trajectories based on the trajectory score, wherein the vehicle is navigated based on the final maneuvering trajectory.

2. The method of claim 1, wherein the plurality of trajectory parameters further comprises a curvature of the plurality of candidate maneuvering trajectories, magnitude of direction change in route in forward path, buffer space between lane and utility space or turn count.

3. The method of claim 1, wherein the plurality of dynamic profile parameters comprises at least one of, a lane congestion, a lane blocking duration, and a highest curvature on trajectory.

4. The method of claim 1, wherein generating the trajectory score comprises:

generating an observation score for each of the plurality of dynamic profile parameters associated with each of the plurality of candidate maneuvering trajectories using the ML model; and generating a trajectory score for each trajectory profile based on the observation score of respective plurality of dynamic profile parameters and a weight associated with corresponding dynamic profile parameter.

5. The method of claim 1, wherein generating the final maneuvering trajectory comprises:

selecting a candidate maneuvering trajectory from the plurality of candidate maneuvering trajectories, having a maximum trajectory score, wherein the selected candidate maneuvering trajectory is the final maneuvering trajectory.

6. The method of claim 1, wherein training the ML model comprises:

receiving training profile parameters, wherein the training profile parameters are generated for training trajectories traversed by an operator;

receiving weight data for each training profile parameter;

annotating an observation score for each training profile parameter; and generating trajectory scores corresponding to the training trajectories based on the observation score of the training profile parameters.

7. A system for generating a maneuvering trajectory for a vehicle in real-time, comprising:

an Electronic Control Unit (ECU) configured in the vehicle, the ECU comprising at least one processor and a memory storing instructions that when executed by the at least one processor, cause the at least one processor to:

obtain a plurality of candidate maneuvering trajectories comprising at least one forward path and at least one reverse path, for maneuvering the vehicle to reach a goal point, wherein the goal point is one of: a parking space, a garage, a gas station, and a point on a global path on a road, wherein the global path is indicative of one or more trajectories from a source location to a destination location, and wherein the plurality of candidate maneuvering trajectories are generated based on a plurality of trajectory parameters that comprise: a vehicle pose, a goal pose, reversing space dimension, side space dimension, and forward space dimension;

determine a plurality of dynamic profile parameters associated with each of the plurality of candidate maneuvering trajectories, wherein the plurality of dynamic profile parameters comprises a length of maneuvering path and number of reverse required for maneuver;

generate a trajectory score for each of the plurality of candidate maneuvering trajectories using a Machine Learning (ML) model, wherein the ML model is trained using the plurality of dynamic profile parameters; and generate a final maneuvering trajectory from the plurality of candidate maneuvering trajectories based on the trajectory score, wherein the vehicle is navigated based on the final maneuvering trajectory.

8. The system of claim 7, wherein the at least one processor is configured to generate the trajectory score by performing steps of:

generating an observation score for each of the plurality of dynamic profile parameters associated with each of the plurality of candidate maneuvering trajectories using the ML model; and generating a trajectory score for each trajectory profile based on the observation score of respective plurality of dynamic profile parameters and a weight associated with corresponding dynamic profile parameter.

9. The system of claim 7, wherein the at least one processor is configured to generate the final maneuvering trajectory by performing step of:

selecting a candidate maneuvering trajectory from the plurality of candidate maneuvering trajectories, having a maximum trajectory score, wherein the selected candidate maneuvering trajectory is the final maneuvering trajectory.

10. The system of claim 7, wherein the at least one processor is configured to train the ML model by performing steps of:

receiving training profile parameters, wherein the training profile parameters are generated for training trajectories traversed by an operator;

receiving weight data for each training profile parameter;

annotating an observation score for each training profile parameter; and generating trajectory scores corresponding to the training trajectories based on the observation score of the training profile parameters.

11. A non-transitory computer readable medium including instructions stored thereon that when processed by at least one processor cause a device to perform operations comprising:

obtaining a plurality of candidate maneuvering trajectories comprising at least one forward path and at least one reverse path, for maneuvering a vehicle to reach a goal point, wherein the goal point is one of: a parking space, a garage, a gas station, and a point on a global path on a road, wherein the global path is indicative of one or more trajectories from a source location to a destination location, and wherein the plurality of candidate maneuvering trajectories are generated based on a plurality of trajectory parameters that comprise: a vehicle pose, a goal pose, reversing space dimension, side space dimension, and forward space dimension;

determining a plurality of dynamic profile parameters associated with each of the plurality of candidate maneuvering trajectories, wherein the plurality of dynamic profile parameters comprises a length of maneuvering path and number of reverse required for maneuver;

generating a trajectory score for each of the plurality of candidate maneuvering trajectories using a Machine Learning (ML) model, wherein the ML model is trained using the plurality of dynamic profile parameters; and generating a final maneuvering trajectory from the plurality of candidate maneuvering trajectories based on the trajectory score, wherein the vehicle is navigated based on the final maneuvering trajectory.

* * * * *